(12) United States Patent
Shi et al.

(10) Patent No.: US 9,064,527 B1
(45) Date of Patent: Jun. 23, 2015

(54) HIGH ORDER TAPERED WAVEGUIDE FOR USE IN A HEAT ASSISTED MAGNETIC RECORDING HEAD

(71) Applicant: Western Digital (Fremont), LLC, Fremont, CA (US)

(72) Inventors: Zhong Shi, Dublin, CA (US); Michael V. Morelli, San Jose, CA (US); Hongxing Yuan, San Ramon, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 13/919,949

(22) Filed: Jun. 17, 2013

Related U.S. Application Data

(60) Provisional application No. 61/811,287, filed on Apr. 12, 2013.

(51) Int. Cl.
  *G11B 11/00*  (2006.01)
  *G11B 11/105* (2006.01)

(52) U.S. Cl.
  CPC .................. *G11B 11/10536* (2013.01)

(58) Field of Classification Search
  None
  See application file for complete search history.

(56) References Cited

U.S. PATENT DOCUMENTS

| | | | |
|---|---|---|---|
| 5,173,909 A | 12/1992 | Sakano et al. |
| 5,199,090 A | 3/1993 | Bell |
| 5,341,391 A | 8/1994 | Ishimura |
| 5,625,729 A | 4/1997 | Brown |
| 5,960,014 A | 9/1999 | Li et al. |
| 6,016,290 A | 1/2000 | Chen et al. |
| 6,018,441 A | 1/2000 | Wu et al. |
| 6,025,978 A | 2/2000 | Hoshi et al. |
| 6,025,988 A | 2/2000 | Yan |
| 6,032,353 A | 3/2000 | Hiner et al. |
| 6,033,532 A | 3/2000 | Minami |
| 6,034,851 A | 3/2000 | Zarouri et al. |
| 6,043,959 A | 3/2000 | Crue et al. |
| 6,046,885 A | 4/2000 | Aimonetti et al. |
| 6,049,650 A | 4/2000 | Jerman et al. |
| 6,055,138 A | 4/2000 | Shi |
| 6,058,094 A | 5/2000 | Davis et al. |

(Continued)

FOREIGN PATENT DOCUMENTS

| | | |
|---|---|---|
| EP | 1498878 A2 | 1/2005 |
| EP | 1501076 A1 | 1/2005 |

OTHER PUBLICATIONS

Chubing Peng, "Surface-plasmon resonance of a planar lollipop near-field transducer", Applied Physics Letters 94, 171106 (2009), 3 pages.

(Continued)

*Primary Examiner* — Wayne Young
*Assistant Examiner* — Brian Butcher

(57) ABSTRACT

A heat-assisted magnetic recording (HAMR) transducer is coupled with a laser for providing energy and has an air-bearing surface (ABS) configured to reside in proximity to a media during use. The HAMR transducer includes a write pole, at least one coil, and a tapered waveguide optically coupled with the laser. The write pole is configured to write to a region of the media. The coil(s) energize the write pole. The tapered waveguide includes an entrance distal from the ABS, a bottom proximate to the ABS, a first side and a second side opposite to the first side. At least a portion of the first side and the second side converge in accordance with a function having at least one term having an order greater than one.

17 Claims, 5 Drawing Sheets

(56) References Cited

U.S. PATENT DOCUMENTS

| | | |
|---|---|---|
| 6,073,338 A | 6/2000 | Liu et al. |
| 6,078,479 A | 6/2000 | Nepela et al. |
| 6,081,499 A | 6/2000 | Berger et al. |
| 6,094,803 A | 8/2000 | Carlson et al. |
| 6,099,362 A | 8/2000 | Viches et al. |
| 6,103,073 A | 8/2000 | Thayamballi |
| 6,108,166 A | 8/2000 | Lederman |
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,275,453 B1 | 8/2001 | Ueyanagi et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |

(56) References Cited

U.S. PATENT DOCUMENTS

| | | |
|---|---|---|
| 6,661,621 B1 | 12/2003 | Iitsuka |
| 6,661,625 B1 | 12/2003 | Sin et al. |
| 6,671,127 B2 | 12/2003 | Hsu et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,195 B2 | 2/2004 | Miyanishi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Sin et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,795,630 B2 | 9/2004 | Challener et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,834,027 B1 | 12/2004 | Sakaguchi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,930,975 B2 | 8/2005 | Tawa et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,975,580 B2 | 12/2005 | Rettner et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,027,700 B2 | 4/2006 | Challener |
| 7,035,046 B1 | 4/2006 | Young et al. |
| 7,041,985 B1 | 5/2006 | Wang et al. |
| 7,042,810 B2 | 5/2006 | Akiyama et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,171,080 B2 | 1/2007 | Rausch |
| 7,177,117 B1 | 2/2007 | Jiang et al. |
| 7,190,539 B1 | 3/2007 | Nibarger |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,266,268 B2 | 9/2007 | Challener et al. |
| 7,272,079 B2 | 9/2007 | Challener |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,330,404 B1 | 2/2008 | Peng et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |

(56) References Cited

U.S. PATENT DOCUMENTS

| | | |
|---|---|---|
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,440,660 B1 | 10/2008 | Jin et al. |
| 7,443,632 B1 | 10/2008 | Stoev et al. |
| 7,444,740 B1 | 11/2008 | Chung et al. |
| 7,486,709 B2 | 2/2009 | Hu et al. |
| 7,492,804 B2 | 2/2009 | Tawa |
| 7,493,688 B1 | 2/2009 | Wang et al. |
| 7,500,255 B2 | 3/2009 | Seigler et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,567,387 B2 | 7/2009 | Itagi et al. |
| 7,580,602 B2 | 8/2009 | Itagi et al. |
| 7,583,466 B2 | 9/2009 | Kermiche et al. |
| 7,595,967 B1 | 9/2009 | Moon et al. |
| 7,596,072 B2 | 9/2009 | Buechel et al. |
| 7,596,295 B2 | 9/2009 | Hasegawa |
| 7,639,457 B1 | 12/2009 | Chen et al. |
| 7,649,677 B2 | 1/2010 | Jin et al. |
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,839,497 B1 | 11/2010 | Rausch et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,968,219 B1 | 6/2011 | Jiang et al. |
| 7,982,989 B1 | 7/2011 | Shi et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,228,779 B2 | 7/2012 | Peng et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,264,919 B2 | 9/2012 | Komura et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |

(56) References Cited

U.S. PATENT DOCUMENTS

| | | | |
|---|---|---|---|
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 * | 6/2013 | Wolf et al. ............... 369/13.33 |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 2001/0006435 A1 | 7/2001 | Ichihara et al. |
| 2001/0017820 A1 | 8/2001 | Akiyama et al. |
| 2003/0184903 A1 | 10/2003 | Challener |
| 2003/0198146 A1 | 10/2003 | Rottmayer et al. |
| 2004/0001394 A1 | 1/2004 | Challener et al. |
| 2004/0001420 A1 | 1/2004 | Challener |
| 2004/0027728 A1 | 2/2004 | Coffey et al. |
| 2004/0223249 A1 | 11/2004 | Kang et al. |
| 2004/0228022 A1 | 11/2004 | Ueyanagi |
| 2005/0047013 A1 | 3/2005 | Le et al. |
| 2005/0078565 A1 | 4/2005 | Peng et al. |
| 2005/0122850 A1 | 6/2005 | Challener et al. |
| 2005/0157393 A1 | 7/2005 | Hasegawa et al. |
| 2005/0157595 A1 | 7/2005 | Tawa et al. |
| 2005/0289576 A1 | 12/2005 | Challener |
| 2007/0081426 A1 | 4/2007 | Lee et al. |
| 2007/0081427 A1 | 4/2007 | Suh et al. |
| 2008/0055343 A1 | 3/2008 | Cho et al. |
| 2008/0180827 A1 | 7/2008 | Zhu et al. |
| 2008/0181560 A1 | 7/2008 | Suh et al. |
| 2008/0198496 A1 | 8/2008 | Shimazawa et al. |
| 2008/0204916 A1 * | 8/2008 | Matsumoto et al. ............ 360/59 |
| 2008/0232225 A1 | 9/2008 | Cho et al. |
| 2010/0290157 A1 | 11/2010 | Zhang et al. |
| 2011/0086240 A1 | 4/2011 | Xiang et al. |
| 2011/0228651 A1 | 9/2011 | Gage et al. |
| 2011/0228652 A1 | 9/2011 | Gage et al. |
| 2011/0235480 A1 | 9/2011 | Goulakov et al. |
| 2012/0020195 A1 | 1/2012 | Seigler |
| 2012/0039155 A1 | 2/2012 | Peng et al. |
| 2012/0111826 A1 | 5/2012 | Chen et al. |
| 2012/0113770 A1 | 5/2012 | Stipe |
| 2012/0216378 A1 | 8/2012 | Emley et al. |
| 2012/0237878 A1 | 9/2012 | Zeng et al. |
| 2012/0298621 A1 | 11/2012 | Gao |
| 2013/0216702 A1 | 8/2013 | Kaiser et al. |

(56) References Cited

U.S. PATENT DOCUMENTS

2013/0216863 A1    8/2013   Li et al.
2013/0257421 A1   10/2013   Shang et al.
2014/0133283 A1*   5/2014   Maletzky et al. .......... 369/13.33

OTHER PUBLICATIONS

Zhong Shi, et al., U.S. Appl. No. 13/797,268, filed Mar. 12, 2013, 21 pages.

* cited by examiner

HIGH ORDER TAPERED WAVEGUIDE FOR USE IN A HEAT ASSISTED MAGNETIC RECORDING HEAD

CROSS-REFERENCE TO RELATED APPLICATIONS

This application claims priority to provisional U.S. Patent Application Ser. No. 61/811,287, filed on Apr. 12, 2013, which is hereby incorporated by reference in its entirety.

BACKGROUND

FIG. 1 depicts a plan view of a portion of a conventional heat assisted magnetic recording (HAMR) transducer 10. The conventional HAMR transducer 10 includes a pole (not shown), coil(s) (not shown), and other components used in writing to a media (not shown). The conventional HAMR transducer 10 is coupled to a laser (not shown) for providing light energy to the HAMR transducer 10. In addition, the HAMR transducer includes a conventional waveguide 20 for directing light from the laser to a near field transducer (NFT) 30 near the ABS. The conventional waveguide 20 is a conventional interferometric tapered waveguide (ITWG).

The conventional ITWG 20 includes an entrance 21, a tapered region 22 and arms 24 and 26. Light enters the conventional ITWG at the entrance 21. The physical dimensions of the core, or waveguide 20, taper linearly in the tapered region 22. In some cases, a linearly tapered mode converter (not shown in FIG. 1) is also used. Thus, the tapered region 22 goes from the wider entrance 21 to a smaller cross-section. Note that the ITWG 20 in FIG. 1 is shown as tapering in the cross-track direction (left-right in FIG. 1). In some cases, the conventional ITWG 20 may taper in the down track direction (out of the plane of the page in FIG. 1). The tapered region 24 confines the energy in the laser mode provided by the laser (not shown in FIG. 1) to a smaller waveguide mode. The light is then split and travels down the arms 24 and 26.

Light in the arms 24 and 26 is directed toward the ABS and meets near the NFT 30. There is an optical path difference between the arms 24 and 26. Typically, the optical path difference is formed by a difference between the physical lengths of the arms 24 and 26. Where the light from the arms 24 and 26 recombines, an interference pattern is formed. An antinode in the interference pattern is at the conventional NFT 30.

Although the conventional ITWG 20 functions, there are drawbacks. A particular phase difference, typically 180°, is desired to be achieved through the optical path difference between the arms 24 and 26. This phase difference depends upon the position of the laser with respect to the waveguide entrance 21. The location of the laser (not shown in FIG. 1) may shift during fabrication of the HAMR transducer 10. For example, the laser may be aligned with the waveguide entrance 21 and then bonded. However, during the bonding process, the location of the laser may change. Thus, misalignments may occur between the laser and the waveguide entrance 21. As a result, the phase difference between light from one arm 24 and light from the other arm 26 meeting at the NFT 30 may change. The location of the antinode for the interference pattern may then shift from the NFT 30. The efficiency of the NFT 30 in coupling in light from the laser may thus be compromised. Thus, performance of the ITWG waveguide 20 may be adversely affected.

Accordingly, what is needed is a HAMR transducer having improved performance.

DETAILED DESCRIPTION OF THE PREFERRED EMBODIMENTS

Figure 1:
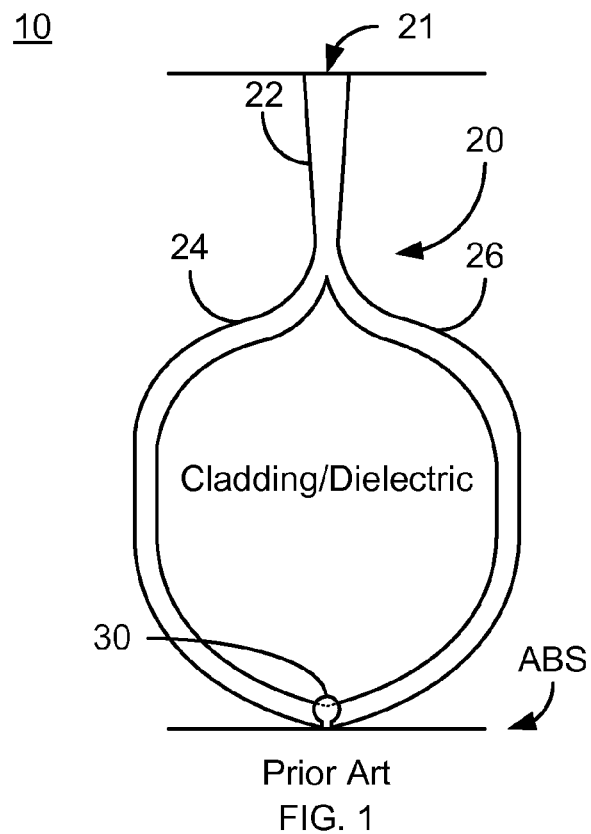
FIG. 1 is a diagram depicting a plan view of a conventional waveguide in a conventional magnetic transducer.
Figure 2:
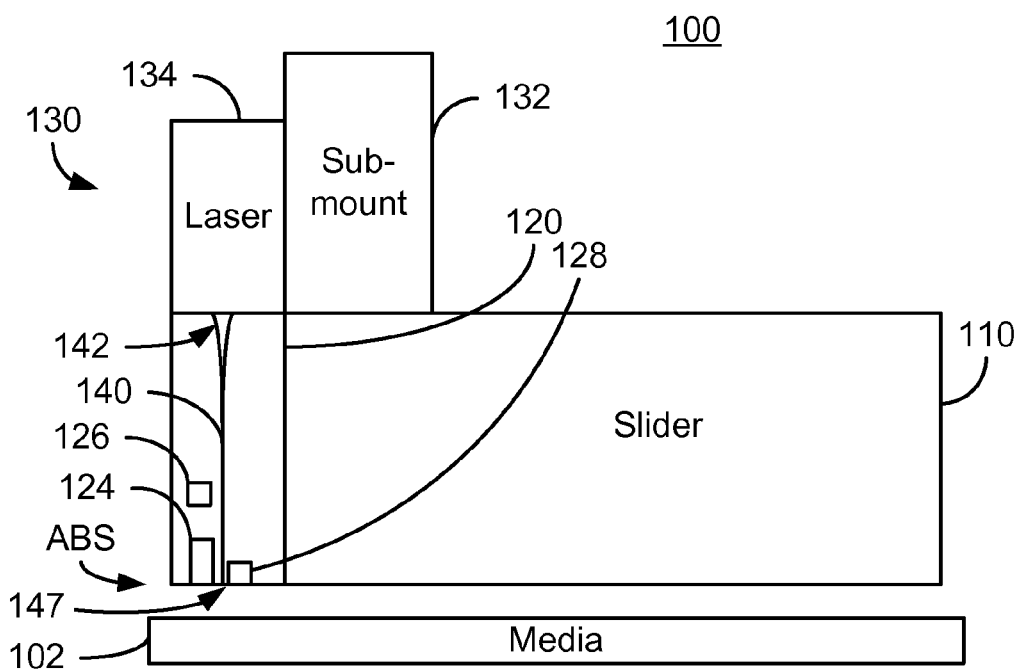
FIG. 2 is depicts an exemplary embodiment of a heat assisted magnetic recording disk drive.

FIG. 2 depicts a side view of an exemplary embodiment of a portion of a heat assisted magnetic recording (HAMR) disk drive 100. For clarity, FIG. 2 is not to scale. For simplicity not all portions of the HAMR disk drive 100 are shown. In addition, although the HAMR disk drive 100 is depicted in the context of particular components other and/or different components may be used. For simplicity, only single components 102, 110, 120, 130 and 140 are shown. However, multiples of each components 102, 110, 120, 130 and/or 140 and their sub-components, might be used.

The HAMR disk drive 100 includes media 102, a slider 110, a HAMR transducer 120 and a laser assembly 130. Additional and/or different components may be included in the HAMR disk drive 100. The slider 110, and thus the laser assembly 130 and HAMR transducer 120 are generally attached to a suspension (not shown). The HAMR transducer 120 is fabricated on the slider 110 and includes an air-bearing surface (ABS) proximate to the media 102 during use.

In general, the HAMR disk drive includes a write transducer and a read transducer. However, for clarity, only the write portion (HAMR transducer 120) of the head is shown. The HAMR transducer 120 includes a tapered waveguide 140, write pole 124, coil(s) 126 and near-field transducer (NFT) 128. In other embodiments, different and/or additional components may be used in the HAMR transducer 120. The tapered waveguide 140 guides light to the NFT 128, which resides near the ABS. The NFT 128 utilizes local resonances in surface plasmons to focus the light to magnetic recording media 102. At resonance, the NFT 128 couples the optical energy of the surface plasmons efficiently into the recording medium layer of the media 102 with a confined optical spot which is much smaller than the optical diffraction limit. This optical spot can rapidly heat the recording medium layer to near or above the Curie point. High density bits can be written on a high coercivity medium with the pole 124 energized by the coils 126 to a modest magnetic field.

The laser assembly 130 includes a submount 132 and a laser 134. The submount 132 is a substrate to which the laser 134 may be affixed for improved mechanical stability, ease of manufacturing and better robustness. The laser 134 may be a chip such as a laser diode. Thus, the laser 134 typically includes at least a resonance cavity, a gain reflector on one end of the cavity, a partial reflector on the other end of the cavity and a gain medium. For simplicity, these components of the laser 134 are not shown in FIG. 2.

The tapered waveguide 140 is a high order tapered waveguide. The tapered waveguide 140 includes at least a first side and a second side opposite to the first side. The first side and the second side converge in accordance with a function having at least one term having an order greater than one. In some embodiments, the highest order term of the function is two. Thus, the tapered waveguide 140 would then be a quadratic tapered waveguide. In other embodiments, the tapered waveguide 140 may have higher order terms. For example, the tapered waveguide 140 may be a cubic tapered waveguide. A single term or multiple terms of the same or different order may also describe the design of the taper for the tapered waveguide 140. Further, where multiple terms are present in the function describing the taper, some terms may have an order less than or equal to one. In addition, although not depicted in FIG. 2, the tapered waveguide 140 may be coupled to the laser through a mode converter. The mode converter also tapers. Thus, the mode converter also confines the laser mode to smaller dimensions. In some embodiments, the mode converter tapers linearly. However, in other embodiments, the mode converter may taper in another fashion. In some embodiments, the mode converter may taper in a manner described by higher or lower orders terms. For example, a higher order mode converter may be a quadratic mode converter that tapers in accordance with a function having a quadratic highest order term. In other embodiments, the highest order term of the mode converter may be higher or lower. Further, the tapers of the mode converter and/or tapered waveguide 140 may taper in accordance with function(s) having terms with non-integer powers. The mode converter and tapered waveguide 140 may taper in the same or different manners.

Figure 3:
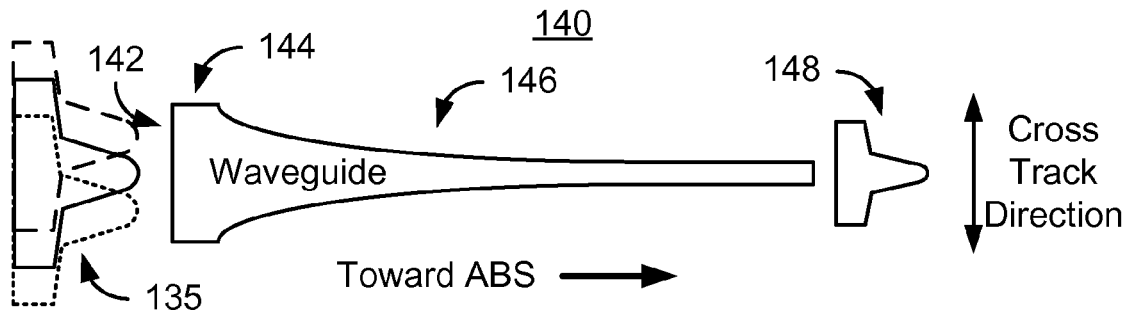
FIG. 3 depicts an exemplary embodiment of a portion of a high order tapered waveguide.

FIG. 3 depicts an exemplary embodiment of a portion of the high order tapered waveguide 140. For clarity, FIG. 3 is not to scale. For simplicity not all portions of the tapered waveguide 140 are shown. In addition, although the tapered waveguide 140 is depicted in the context of particular components other and/or different components may be used. In addition to the tapered waveguide 140, the laser mode 135 and waveguide mode 148 output by the tapered section 146 are depicted. Portions of the tapered waveguide 140 closer to the ABS than the taper 146 are not depicted in FIG. 3. Note that the laser modes 135 having different positions are denoted by a dotted line, a solid line, and a dashed line.

Referring to FIGS. 2 and 3, the tapered waveguide 140 includes an entrance 142 and a bottom 147. The entrance 142 is optically coupled with the laser 142 and distal from the ABS. The bottom 147 of the tapered waveguide 140 is at or near the ABS. In the embodiment shown, the tapered waveguide 140, has a straight section 144 near the entrance. However, this section may be omitted. The tapered waveguide 140 also includes a taper 146 between the entrance 142 and the bottom, or exit 147. Although not shown in FIG. 3, the tapered waveguide 140 may include curved sections. Further, the tapered waveguide 140 may be an interferometric tapered waveguide having multiple arms. In such embodiment, the tapered section 146 is generally located between the entrance 142 and to point at which the tapered waveguide 140 is split into multiple arms.

As can be seen in FIG. 3, the sides of the tapered waveguide 140 are shown as forming a high order taper in the cross-track direction. The sides of the tapered waveguide 140 may converge only in the cross-track direction, only in the down track direction, or in both the cross-track and down track directions. Further, the sides of the tapered waveguide 140 are shown as being symmetric in FIGS. 2 and 3. Thus, opposite sides of the tapered waveguide 140 converge in a like manner. However, in other embodiments, opposing sides of the tapered waveguide 140 may be asymmetric and converge in different manners. As discussed above the sidewalls waveguide core for the tapered section 146 converge at a higher order than one (linearly). For example, in one embodiment, the sidewalls may converge based on a quadratic, cubic or other order greater than one. A single term or multiple terms of the same or different order may also describe the design of the taper 146 for the tapered waveguide 140.

In operation, the laser 134 emits light that is provided to the waveguide 122. The taper 146 of the tapered waveguide 140 and, in some embodiments, the mode converter (not shown in FIGS. 2-3) confine the mode propagated through the tapered waveguide 140 to a smaller physical area. In addition, the tapered waveguide 140 directs the modulated light to the NFT 128. The NFT 128 focuses the modulated light to a region of magnetic recording media 102 using surface plasmons. The NFT 128 thus couples the optical energy of the modulated light into the recording medium layer of the media 102 with a confined optical spot that is much smaller than the optical diffraction limit. This optical spot can typically heat the recording medium layer above the Curie point on the sub-nanosecond scale. High density bits can be written on a high coercivity medium with the pole 124 energized by the coils 126 to a modest magnetic field.

Use of the tapered waveguide 140 may improve the performance of the HAMR disk drive 100. In particular, the taper 146 more rapidly confines the mode propagated by the tapered waveguide 140 and may make the mode propagated more stable. For example, the laser mode 135 shown in FIG. 3 corresponds to the intensity of the energy provided from the laser 132 to the entrance 142 of the tapered waveguide 140. Some portion of this energy is coupled into the tapered waveguide 140 and confined to the waveguide mode 148 output by the taper 146 of the waveguide 140. The mode 148 may be closer to the geometric center of the tapered waveguide 140 than for a conventional waveguide. Further, for an ITWG, this conversion may occur closer to the entrance 142 than for a conventional waveguide. Because the mode 148 is more rapidly confined to a smaller region closer to the center of the waveguide, the mode propagated by the tapered waveguide 140 is more stable. Stated differently, the mode 148 is less sensitive to the position of the laser 134 and, therefore, the position of the mode 135. If the tapered waveguide 140 is an ITWG, the position of the antinode of the interference pattern formed is less subject to the position of the laser 134. The NFT 128 is thus better able to couple energy into the media 102. As a result, performance of the HAMR transducer 120 may be improved.

Figure 4:
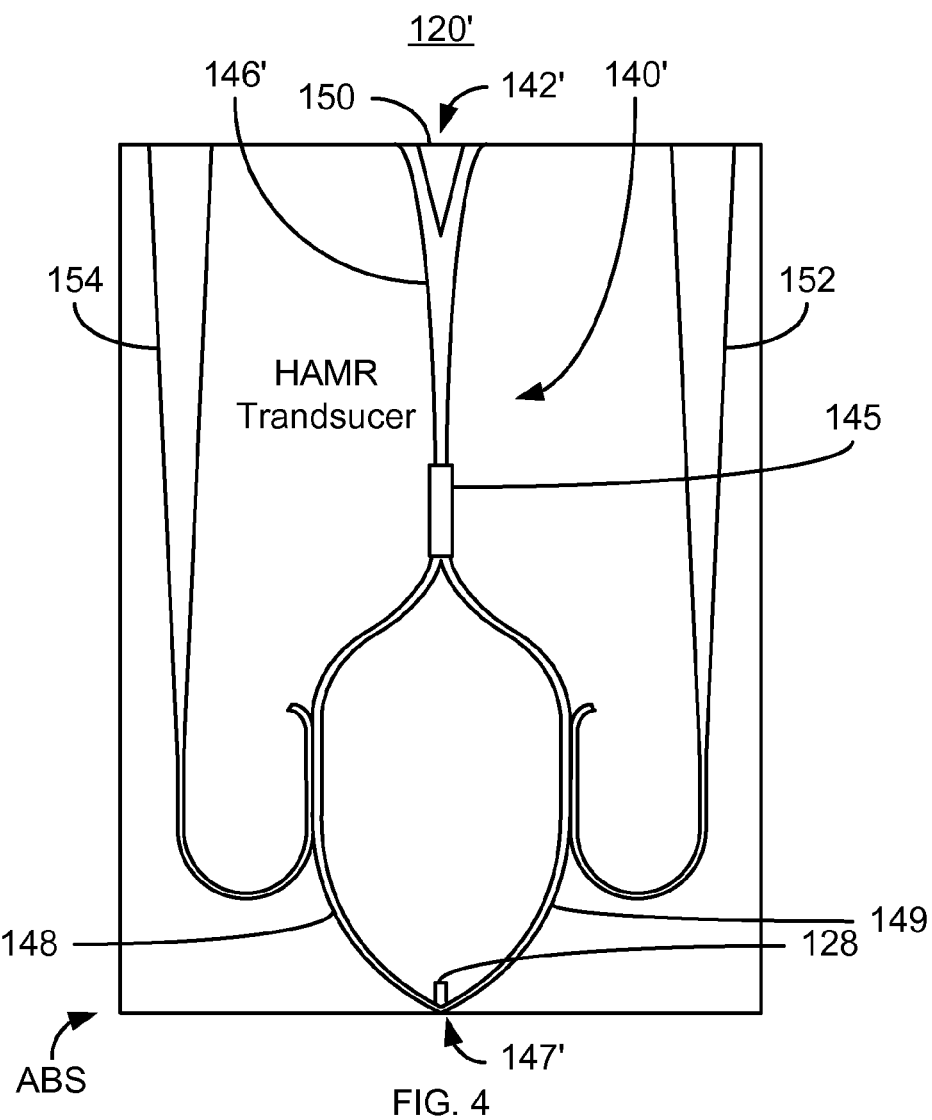
FIG. 4 depicts an exemplary embodiment of a portion of a HAMR transducer including a high order tapered waveguide.

FIG. 4 depicts another exemplary embodiment of a HAMR transducer 120'. For clarity, FIG. 4 is not to scale. The HAMR transducer 120' is analogous to the HAMR transducer 120. Thus, the HAMR transducer 120' may reside in the disk drive 100. Analogous portions of the HAMR transducer 120' are thus labeled similarly in FIG. 4. Referring to FIGS. 2 and 4, the HAMR transducer 120' includes a tapered waveguide 140' that has an entrance 142', a taper 146' and an exit 147' that are analogous to the waveguide 140, entrance 142, taper 146 and exit 147. The HAMR transducer also includes an optional NFT 128 and optional mode converter 150. Also shown are optional taps 152 and 154 that may be used to output a portion of the light coupled into the waveguide 140. In alternate embodiments, the taps 152 and/or 154 may be omitted.

In the embodiment shown, the tapered waveguide 140' is an ITWG. Thus, the waveguide 140' includes arms 148 and 149. The taper 146' is a higher order taper described above. Thus, the taper 146' may be described by a function having one or more terms having an order greater than one. In addition, the mode converter 150 may have a high order taper. In other embodiments, the mode converter 150 may have a linear taper.

The tapered waveguide 140' shares the benefits of the waveguide 140. In particular, the taper 146 may more rapidly confine the mode propagated by the waveguide to a smaller region and a position closer to the geometric center of the waveguide 140'. Thus, a single mode propagated by the waveguide 140' may be more stable and less sensitive to the position of the laser 134. Stated differently, the positions of the antinodes in the interference pattern developed near the exit 147' may be more likely to remain at the NFT 128 when the position of the laser 134 changes. Consequently, performance and reliability of the HAMR transducer 120' may be enhanced.

Figure 5:
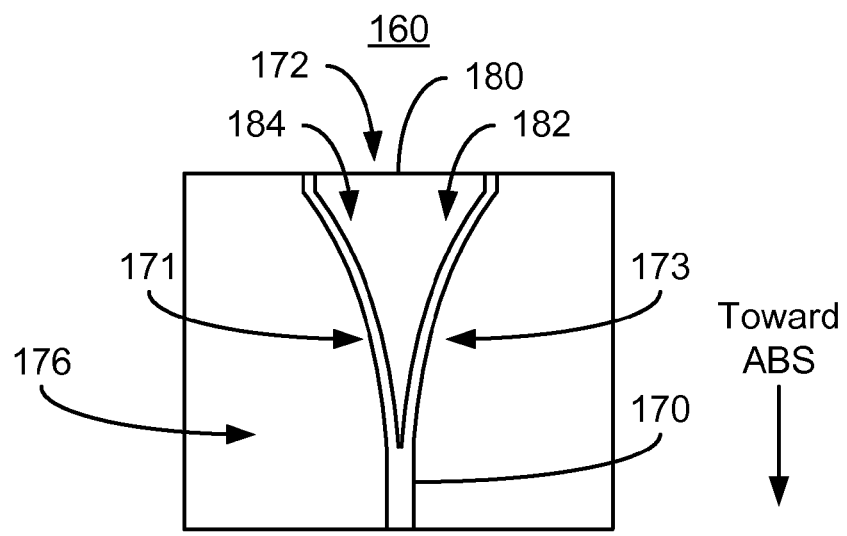
FIG. 5 depicts another exemplary embodiment of a portion of a HAMR transducer including a high order tapered waveguide.

FIG. 5 depicts another exemplary embodiment of a HAMR transducer 160. For clarity, FIG. 5 is not to scale. Further, only a portion of the transducer 160 is depicted. The HAMR transducer 160 is analogous to the HAMR transducer(s) 120/120'. Thus, the HAMR transducer 160 may reside in the disk drive 100. Analogous portions of the HAMR transducer 160 are thus labeled similarly in FIG. 5 as in FIGS. 2-4. Referring to FIGS. 2 and 5, the HAMR transducer 160 includes a tapered waveguide 170 that has an entrance 172 and a taper 176 that are analogous to the waveguide 140/140', entrance 142/142' and taper 146/146'. The HAMR transducer also includes an optional mode converter 180 analogous to the optional mode converter 150.

The waveguide 170 is a tapered waveguide 170. The taper waveguide 170 includes opposing sides 171 and 173. The sides 171 and 173 converge in accordance with a function having at least one term having an order greater than one. In the embodiment shown, the sides 171 and 173 converge as a quadratic taper. In other embodiments, the sides 171 and 173 may converge in accordance with another function having a highest power greater than 1. Similarly, the mode converter 180 includes sides 182 and 184 that converge in a quadratic taper. Thus, the sides 182 and 184 of the mode converter 180 converge in the same manner as the sides 171 and 173 of the waveguide 170. In other embodiments, the sides 171 and 173 of the waveguide 170 may converge in a different manner than the sides 182 and 184 of the mode converter 180.

The tapered waveguide 140 170 shares the benefits of the waveguide 140 and/or 140'. In particular, the taper 176 may more rapidly confine the mode propagated by the waveguide to a smaller region and a position closer to the geometric center of the waveguide 170. Thus, the mode propagated by the waveguide 170 may be more stable and less sensitive to the position of the laser 134. Stated differently, the positions of the antinodes in the interference pattern developed near the exit (not shown in FIG. 5) may be more likely to remain at the NFT 128 when the position of the laser 134 changes. Consequently, performance and reliability of the HAMR transducer 160 may be enhanced.

Figure 6:
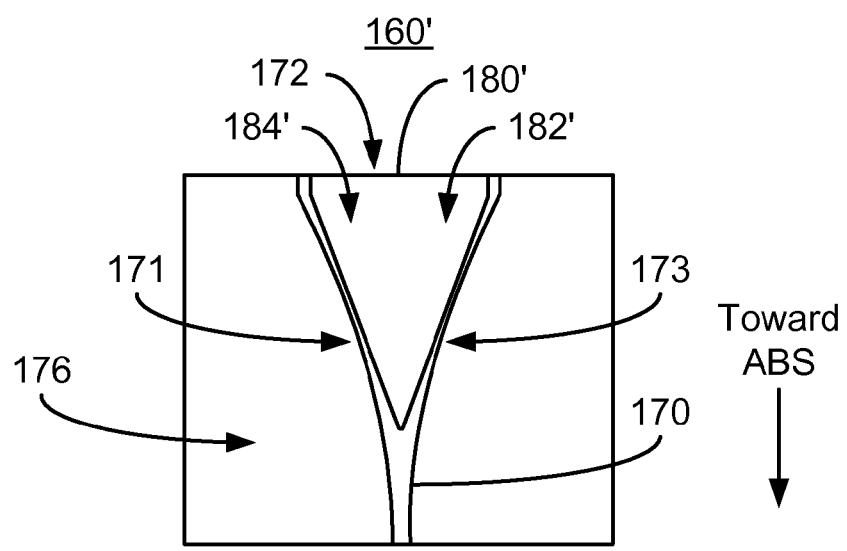
FIG. 6 depicts another exemplary embodiment of a portion of a HAMR transducer including a high order tapered waveguide.

FIG. 6 depicts another exemplary embodiment of a HAMR transducer 160'. For clarity, FIG. 6 is not to scale. Further, only a portion of the transducer 160' is depicted. The HAMR transducer 160' is analogous to the HAMR transducer 160. Thus, the HAMR transducer 160' may reside in the disk drive 100. Analogous portions of the HAMR transducer 160' are thus labeled similarly in FIG. 6 as in FIGS. 2 and 5. Referring to FIGS. 2 and 6, the HAMR transducer 160' includes a tapered waveguide 140 170 that has an entrance 172, a taper 176 and sides 171 and 173 that are analogous to the waveguide 170, entrance 172, taper 176 and sides 171 and 173 shown in FIG. 5. The HAMR transducer also includes an optional mode converter 180' analogous to the optional mode converter 180.

The mode converter 180' includes sides 182' and 184' that converge in a linear taper. Thus, the sides 182' and 184' of the mode converter 180' converge in a different manner than the sides 171 and 173 of the waveguide 170. Further, the sides 182' and 184' converge more slowly than the sides 171 and 173. However, the waveguide 170 is still a tapered waveguide 140.

The HAMR transducer 160' shares the benefits of the HAMR transducer 160 and thus the HAMR transducer(s) 120 and/or 120'. In particular, the taper 176 may more rapidly confine the mode propagated by the waveguide to a smaller region and a position closer to the geometric center of the waveguide 170. Thus, the mode propagated by the waveguide 170 may be more stable and less sensitive to the position of the laser 134. Consequently, performance and reliability of the HAMR transducer 160' may be improved.

Figure 7:
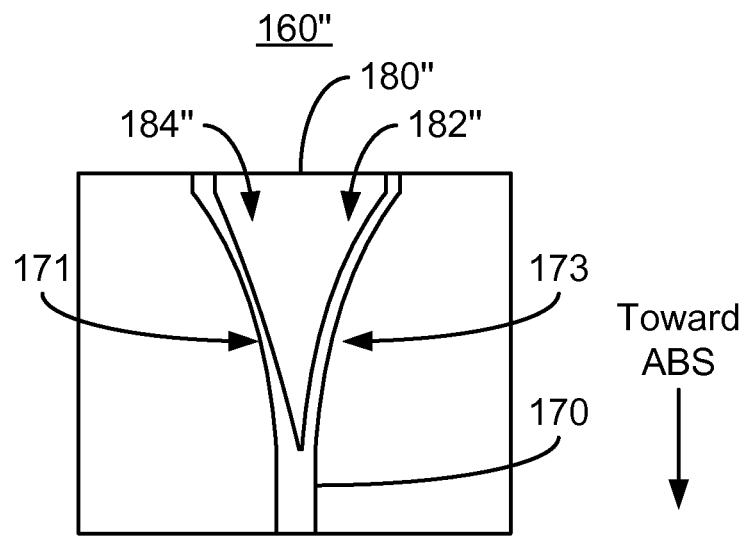
FIG. 7 depicts another exemplary embodiment of a portion of a HAMR transducer including a high order tapered waveguide.

FIG. 7 depicts another exemplary embodiment of a HAMR transducer 160". For clarity, FIG. 7 is not to scale. Further, only a portion of the transducer 160" is depicted. The HAMR transducer 160" is analogous to the HAMR transducer(s) 160 and 160'. Thus, the HAMR transducer 160" may reside in the disk drive 100. Analogous portions of the HAMR transducer 160" are thus labeled similarly in FIG. 7 as in FIGS. 2 and 5-6. Referring to FIGS. 2 and 7, the HAMR transducer 160" includes a tapered waveguide 140 170 that has an entrance 172, a taper 176 and sides 171 and 173 that are analogous to the waveguide 170, entrance 172, taper 176 and sides 171 and 173 shown in FIGS. 5-6. The HAMR transducer also includes an optional mode converter 180" analogous to the optional mode converter(s) 180/180'.

The mode converter 180' includes sides 182" and 184" that converge in an asymmetric manner. Side 184" tapers linearly, while the side 182" tapers quadratically. Thus, the sides 182" and 184" of the mode converter 180" converge in a different manner than the sides 171 and 173 of the waveguide 170 and in a different manner than each other. Further, the side 184" converges more slowly than the sides 171 and 173. However, the waveguide 170 is still a tapered waveguide 140.

The HAMR transducer 160" shares the benefits of the HAMR transducer(s) 160/160' and thus the HAMR transducer(s) 120 and/or 120'. In particular, the taper 176 more rapidly confines the mode propagated by the waveguide to a smaller region and a position closer to the geometric center of the waveguide 170. Thus, the single mode propagated by the waveguide 170 may be more stable and less sensitive to the position of the laser 134. Consequently, performance and reliability of the HAMR transducer 160" may be improved. Note, however, that there may be some degradation in performance due to the asymmetric taper of the mode converter 180".

Figure 8:
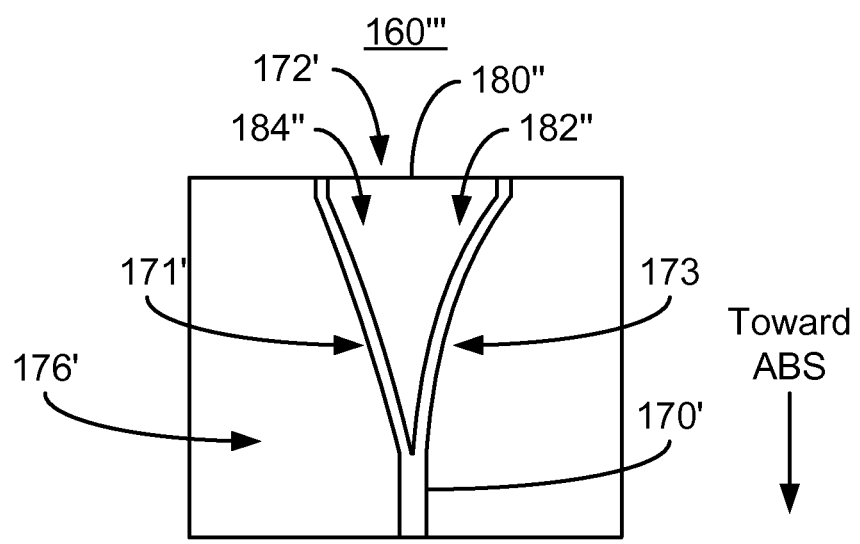
FIG. 8 depicts another exemplary embodiment of a portion of a HAMR transducer including a high order tapered waveguide.
Figure 9:
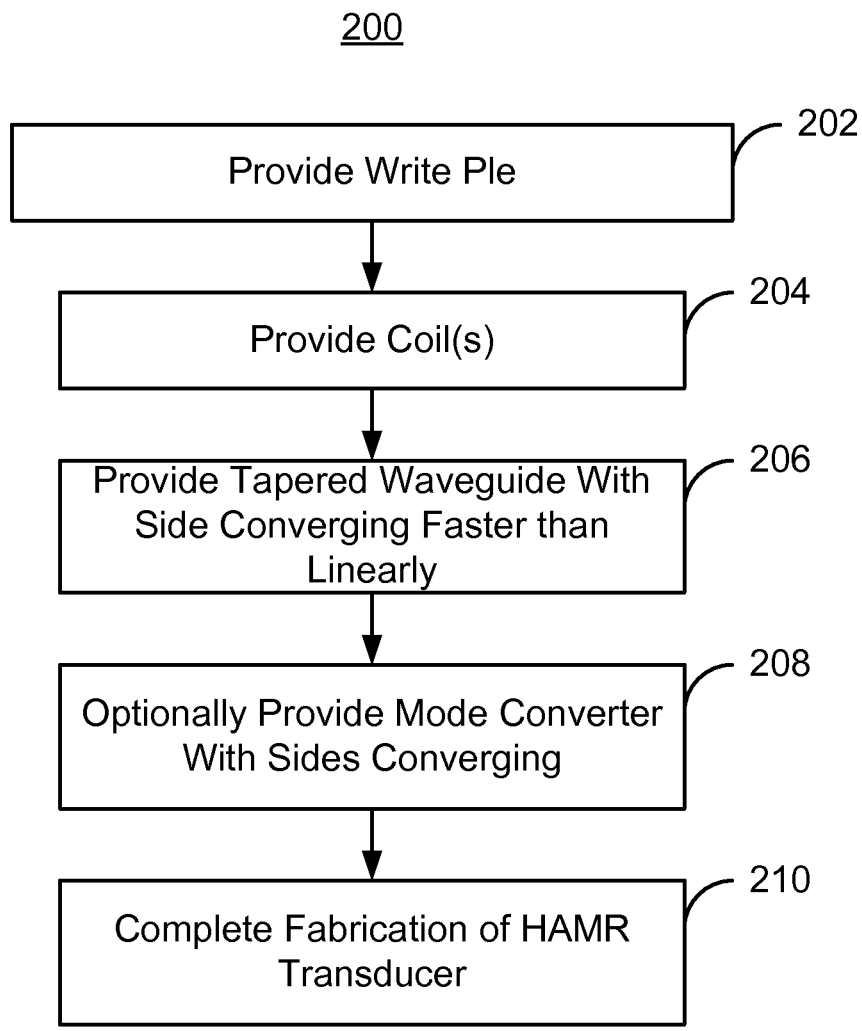
FIG. 9 is a flow chart depicting an exemplary embodiment of a method for fabricating a HAMR transducer including a high order interferometric tapered waveguide.

FIG. 8 depicts another exemplary embodiment of a HAMR transducer 160'''. For clarity, FIG. 8 is not to scale. Further, only a portion of the transducer 160''' is depicted. The HAMR transducer 160''' is analogous to the HAMR transducer(s) 160, 160' and 160". Thus, the HAMR transducer 160''' may reside in the disk drive 100. Analogous portions of the HAMR transducer 160''' are thus labeled similarly in FIG. 8 as in FIGS. 2 and 5-7. Referring to FIGS. 2 and 8, the HAMR transducer 160''' includes a tapered waveguide 140 170' that has an entrance 172', a taper 176' and sides 171' and 173' that are analogous to the waveguide 170", entrance 172', taper 176' and sides 171' and 173' shown in FIGS. 5-7. The HAMR transducer also includes an optional mode converter 180" analogous to the optional mode converter(s) 180/180'. In addition, the sides 182" and 184" converge asymmetrically.

The waveguide 170' includes sides 171' and 173' that converge in an asymmetric manner. Side 171' tapers linearly, while the side 173' tapers quadratically. Thus, the sides 182" and 184" of the mode converter 180" converge in the same manner as the sides 171' and 173' of the waveguide 170 and in a different manner than each other. Further, the side 171' converges more slowly than the sides 173'. However, the waveguide 170 is still a tapered waveguide 140.

The HAMR transducer 160''' shares the benefits of the HAMR transducer(s) 160/160'/160" and thus the HAMR transducer(s) 120 and/or 120'. In particular, the taper 176' may more rapidly confine the mode propagated by the waveguide to a smaller region and a position closer to the geometric center of the waveguide 170'. Thus, the mode propagated by the waveguide 170' may be more stable and less sensitive to the position of the laser 134. Consequently, performance and reliability of the HAMR transducer 160''' may be improved. Note, however, that there may be some degradation in performance due to the asymmetric tapers of the mode converter 180" and waveguide 170'.

Thus, various tapered waveguide 140s 140, 140', 170 and 170' and HAMR transducers 120, 120', 160, 160', 160", and 160''' have been described. Various features are highlighted in the waveguides 140, 140', 170 and 170' and HAMR transducers 120, 120', 160, 160', 160", and 160'''. One or more features of the waveguides 140, 140', 170 and 170' and HAMR transducers 120, 120', 160, 160', 160", and 160''' may be combined other manners not explicitly depicted. For example, the mode converter may converge more rapidly than the waveguide.

FIG. 10 is a flow chart depicting an exemplary embodiment of a method 200 for fabricating HAMR transducers having high order waveguides and, in some embodiments mode converters. In particular, the method 200 may be used in fabricating a HAMR transducer 120, 120', 160, 160', 160", and/or 160'''. For simplicity, some steps may be omitted, performed in another order, interleaved with other steps and/or combined. The magnetic recording transducer being fabricated may be part of a merged head that also includes a read head (not shown) and resides on a slider (not shown) in a disk drive. The method 200 is described in the context of forming a single transducer 120 in a disk drive 100. However, the method 200 may be used to fabricate multiple transducers at substantially the same time. Further, the method 200 may be used in fabricating other transducer including but not limited to the transducers 120', 160, 160', 160" and/or 160'''. The method 200 and system are also described in the context of particular layers. However, in some embodiments, such layers may include multiple sub-layers. The method 200 also may commence after formation of other portions of the magnetic recording transducer.

A write pole configured to write to a region of the media 102 is provided, via step 202. Step 202 typically include multiple substeps that form the pole 124. One or more write coils 126 are provided, via step 204.

A tapered waveguide 140 optically coupled with the laser 134 is provided, via step 206. Step 206 typically includes depositing cladding and core layers for the waveguide 140 and defining the waveguide (e.g. the waveguide core) 140 using photolithography. Step 206 may also be used to provide the waveguide 170 and/or 170'. A mode converter may also be provided, via step 208. Thus, the mode converter 150, 180, 180' and/or 180" may be formed using step 208. Fabrication of the HAMR transducer 120 may then be completed, via step 210. For example, an NFT, shields, other poles, a read transducer and/or other components may be formed.

Using the method 200, the waveguide 140, 170 and/or 170' may be formed. The transducer(s) 120, 120', 160, 160', 160" and/or 160" may be fabricated. Because of the use of the high order taper and, in some embodiments, mode converter, the waveguides 140/170/170' have greater tolerance for misalignments. Further, the ability of the waveguide 140/170/170' to rapidly confine the waveguide mode to the center of the waveguide 140/170/170' may be enhanced. Consequently, performance of the HAMR transducer 120/120'/160/160'/160"/160" may be enhanced and the yield for the method 200 improved.

We claim:

1. A heat assisted magnetic recording (HAMR) transducer coupled with a laser for providing energy and having an air-bearing surface (ABS) configured to reside in proximity to a media during use, the HAMR transducer comprising:
   a write pole configured to write to a region of the media;
   at least one coil for energizing the write pole;
   a tapered waveguide optically coupled with the laser, the tapered waveguide including an entrance distal from the ABS, a bottom proximate to the ABS, a first side and a second side opposite to the first side, at least a portion of the first side and at least a portion of the second side converging in accordance with a function having at least one term having an order that is at least three;
   wherein the waveguide is an interferometric tapered waveguide including a plurality of arms.

2. A heat assisted magnetic recording (HAMR) transducer coupled with a laser for providing energy and having an air-bearing surface (ABS) configured to reside in proximity to a media during use, the HAMR transducer comprising:
   a write pole configured to write to a region of the media;
   at least one coil for energizing the write pole;
   a tapered waveguide optically coupled with the laser, the tapered waveguide including an entrance distal from the ABS, a bottom proximate to the ABS, a first side and a second side opposite to the first side, at least a portion of the first side and at least a portion of the second side converging in accordance with a function having at least one term having an order greater than one; and
   a mode converter optically coupled between the laser and the tapered waveguide,
   the mode converter having a mode converter order different from the order of the function for tapered waveguide;
   wherein the waveguide is an interferometric tapered waveguide including a plurality of arms.

3. The HAMR transducer of claim 2 wherein the mode converter order is greater than one.

4. The HAMR transducer of claim 3 wherein the mode converter is a quadratic mode converter.

5. The HAMR transducer of claim 2 wherein the mode converter is a linear mode converter.

6. A heat assisted magnetic recording (HAMR) transducer coupled with a laser for providing energy and having an air-bearing surface (ABS) configured to reside in proximity to a media during use, the HAMR transducer comprising:

a write pole configured to write to a region of the media;

at least one coil for energizing the write pole;

a quadratic mode converter optically coupled with the laser; and a quadratic tapered waveguide optically coupled with the laser through the quadratic mode converter, the quadratic tapered waveguide including an entrance distal from the ABS, a bottom proximate to the ABS, a first side and a second side opposite to the first side, at least a portion of the first side and at least a portion of the second side converging in accordance with a function having at least one term of second order, the waveguide being an interferometric tapered waveguide including a plurality of arms.

7. A heat assisted magnetic recording (HAMR) disk drive comprising:

a media for storing data;

a slider having an air-bearing surface (ABS) configured to reside in proximity to the media during use;

a laser coupled with the slider for providing energy;

an HAMR transducer coupled with the slider and including a write pole, at least one coil, and a tapered waveguide optically coupled with the laser, the tapered waveguide including an entrance distal from the ABS, a bottom proximate to the ABS, a first side and a second side opposite to the first side, at least a portion of the first side and at least a portion of the second side converging in accordance with a function having at least one term having an order greater than one; and a mode converter optically coupled between the laser and the tapered waveguide, the mode converter having a mode converter order different from the order of the function for tapered waveguide;

wherein the waveguide is an interferometric tapered waveguide including a plurality of arms.

8. A method for providing a heat assisted magnetic recording (HAMR) transducer coupled with a laser for providing energy and having an air-bearing surface (ABS) configured to reside in proximity to a media during use, the HAMR transducer comprising:

providing a write pole configured to write to a region of the media;

providing at least one coil for energizing the write pole;

providing a tapered waveguide optically coupled with the laser, the tapered waveguide including an entrance distal from the ABS, a bottom proximate to the ABS, a first side and a second side opposite to the first side, at least a portion of the first side and at least a portion of the second side converging in accordance with a function having at least one term having an order of at least three, wherein the waveguide is an interferometric tapered waveguide including a plurality of arms.

9. A method for providing a heat assisted magnetic recording (HAMR) transducer coupled with a laser for providing energy and having an air-bearing surface (ABS) configured to reside in proximity to a media during use, the HAMR transducer comprising:

providing a write pole configured to write to a region of the media;

providing at least one coil for energizing the write pole;

providing a tapered waveguide optically coupled with the laser, the tapered waveguide including an entrance distal from the ABS, a bottom proximate to the ABS, a first side and a second side opposite to the first side, at least a portion of the first side and at least a portion of the second side converging in accordance with a function having at least one term having an order, the order being at least two such that at least one term includes a quadratic term; and providing a mode converter optically coupled between the laser and the tapered waveguide, the mode converter having a mode converter order different from the order of the function for tapered waveguide.

10. A method for providing a heat assisted magnetic recording (HAMR) transducer coupled with a laser for providing energy and having an air-bearing surface (ABS) configured to reside in proximity to a media during use, the HAMR transducer comprising:

providing a write pole configured to write to a region of the media;

providing at least one coil for energizing the write pole;

providing a tapered waveguide optically coupled with the laser, the tapered waveguide including an entrance distal from the ABS, a bottom proximate to the ABS, a first side and a second side opposite to the first side, at least a portion of the first side and at least a portion of the second side converging in accordance with a function having at least one term having an order, the order being at least two such that at least one term includes a quadratic term; and providing a mode converter optically coupled between the laser and the tapered waveguide, the mode converter having a mode converter order different from the order of the function for tapered waveguide.

11. The method of claim 10 wherein the converter order is greater than one.

12. The method of claim 11 wherein the mode converter is a quadratic mode converter.

13. The method of claim 10 wherein the mode converter is a linear mode converter.

14. The HAMR transducer of claim 1 wherein the interferometric tapered waveguide is an inverse tapered waveguide.

15. The HAMR transducer of claim 6 wherein the interferometric tapered waveguide is an inverse tapered waveguide.

16. The HAMR transducer of claim 7 wherein the interferometric tapered waveguide is an inverse tapered waveguide.

17. The HAMR transducer of claim 8 wherein the interferometric tapered waveguide is an inverse tapered waveguide.

* * * * *